(12) United States Patent
Zhang et al.

(10) Patent No.: US 12,519,604 B2
(45) Date of Patent: Jan. 6, 2026

(54) INDICATING USER EQUIPMENT CAPABILITY INFORMATION ASSOCIATED WITH SUBBAND FULL DUPLEX CONFIGURATION TYPES

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US); Tao Luo, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 705 days.

(21) Appl. No.: 17/813,191

(22) Filed: Jul. 18, 2022

(65) Prior Publication Data

US 2024/0022388 A1    Jan. 18, 2024

(51) Int. Cl.
*H04L 5/14*     (2006.01)
*H04W 8/24*    (2009.01)

(52) U.S. Cl.
CPC ............... *H04L 5/14* (2013.01); *H04W 8/24* (2013.01)

(58) Field of Classification Search
None
See application file for complete search history.

(56) References Cited

U.S. PATENT DOCUMENTS

2025/0254018 A1 *  8/2025  Grant .................. H04L 27/2605

FOREIGN PATENT DOCUMENTS

WO    WO-2023211050 A1 *  11/2023  ............ H04W 72/50

OTHER PUBLICATIONS

3GPP TSG RAN WG1 #109-e R1-2203204, "Discussion of subband non-overlapping full duplex", May 9-20, 2022, pp. 1-10 (Year: 2022).*
3GPP TSG RAN WG1 #109-e R1-220xxxx, "Summary #2 of [109-e-R18-Duplex-03] Email discussion on subband non-overlapping full duplex", May 9-20, 2022, pp. 1-41 (Year: 2022).*

* cited by examiner

*Primary Examiner* — Scott M Sciacca
(74) *Attorney, Agent, or Firm* — Harrity & Harrity, LLP

(57) ABSTRACT

Various aspects of the present disclosure generally relate to wireless communication. In some aspects, a user equipment (UE) may transmit capability information indicative of a capability of the UE to support one or more subband full-duplex (SBFD) configuration types of a plurality of SBFD configuration types. The UE may receive configuration information indicative of an SBFD configuration having at least one SBFD configuration type of the one or more SBFD configuration types. Numerous other aspects are described.

30 Claims, 11 Drawing Sheets

INDICATING USER EQUIPMENT CAPABILITY INFORMATION ASSOCIATED WITH SUBBAND FULL DUPLEX CONFIGURATION TYPES

FIELD OF THE DISCLOSURE

Aspects of the present disclosure generally relate to wireless communication and to techniques and apparatuses for indicating user equipment capability information associated with subband full duplex configuration types.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to transmit capability information indicative of a capability of the UE to support one or more subband full-duplex (SBFD) configuration types of a plurality of SBFD configuration types. The one or more processors may be configured to receive configuration information indicative of an SBFD configuration having at least one SBFD configuration type of the one or more SBFD configuration types.

Some aspects described herein relate to a network node for wireless communication. The network node may include a memory and one or more processors coupled to the memory. The one or more processors may be configured to receive, from a UE, capability information indicative of a capability of the UE to support one or more SBFD configuration types of a plurality of SBFD configuration types. The one or more processors may be configured to transmit, to the UE, configuration information indicative of an SBFD configuration having an SBFD configuration type of the one or more SBFD configuration types.

Some aspects described herein relate to a method of wireless communication performed by a UE. The method may include transmitting capability information indicative of a capability of the UE to support one or more SBFD configuration types of a plurality of SBFD configuration types. The method may include receiving configuration information indicative of an SBFD configuration having at least one SBFD configuration type of the one or more SBFD configuration types.

Some aspects described herein relate to a method of wireless communication performed by a network node. The method may include receiving, from a UE, capability information indicative of a capability of the UE to support one or more SBFD configuration types of a plurality of SBFD configuration types. The method may include transmitting, to the UE, configuration information indicative of an SBFD configuration having an SBFD configuration type of the one or more SBFD configuration types.

Some aspects described herein relate to a non-transitory computer-readable medium that stores one or more instructions for wireless communication by a UE. The one or more instructions, when executed by one or more processors of the UE, may cause the UE to transmit capability information indicative of a capability of the UE to support one or more SBFD configuration types of a plurality of SBFD configuration types. The one or more instructions, when executed by one or more processors of the UE, may cause the UE to receive configuration information indicative of an SBFD configuration having at least one SBFD configuration type of the one or more SBFD configuration types.

Some aspects described herein relate to a non-transitory computer-readable medium that stores one or more instructions for wireless communication by a network node. The one or more instructions, when executed by one or more processors of the network node, may cause the network node to receive, from a UE, capability information indicative of a capability of the UE to support one or more SBFD configuration types of a plurality of SBFD configuration types. The one or more instructions, when executed by one or more processors of the network node, may cause the network node to transmit, to the UE, configuration information indicative of an SBFD configuration having an SBFD configuration type of the one or more SBFD configuration types.

Some aspects described herein relate to an apparatus for wireless communication. The apparatus may include means for transmitting capability information indicative of a capability of the apparatus to support one or more SBFD configuration types of a plurality of SBFD configuration types. The apparatus may include means for receiving configuration information indicative of an SBFD configuration having at least one SBFD configuration type of the one or more SBFD configuration types.

Some aspects described herein relate to an apparatus for wireless communication. The apparatus may include means for receiving, from a UE, capability information indicative of a capability of the UE to support one or more SBFD configuration types of a plurality of SBFD configuration types. The apparatus may include means for transmitting, to the UE, configuration information indicative of an SBFD configuration having an SBFD configuration type of the one or more SBFD configuration types.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
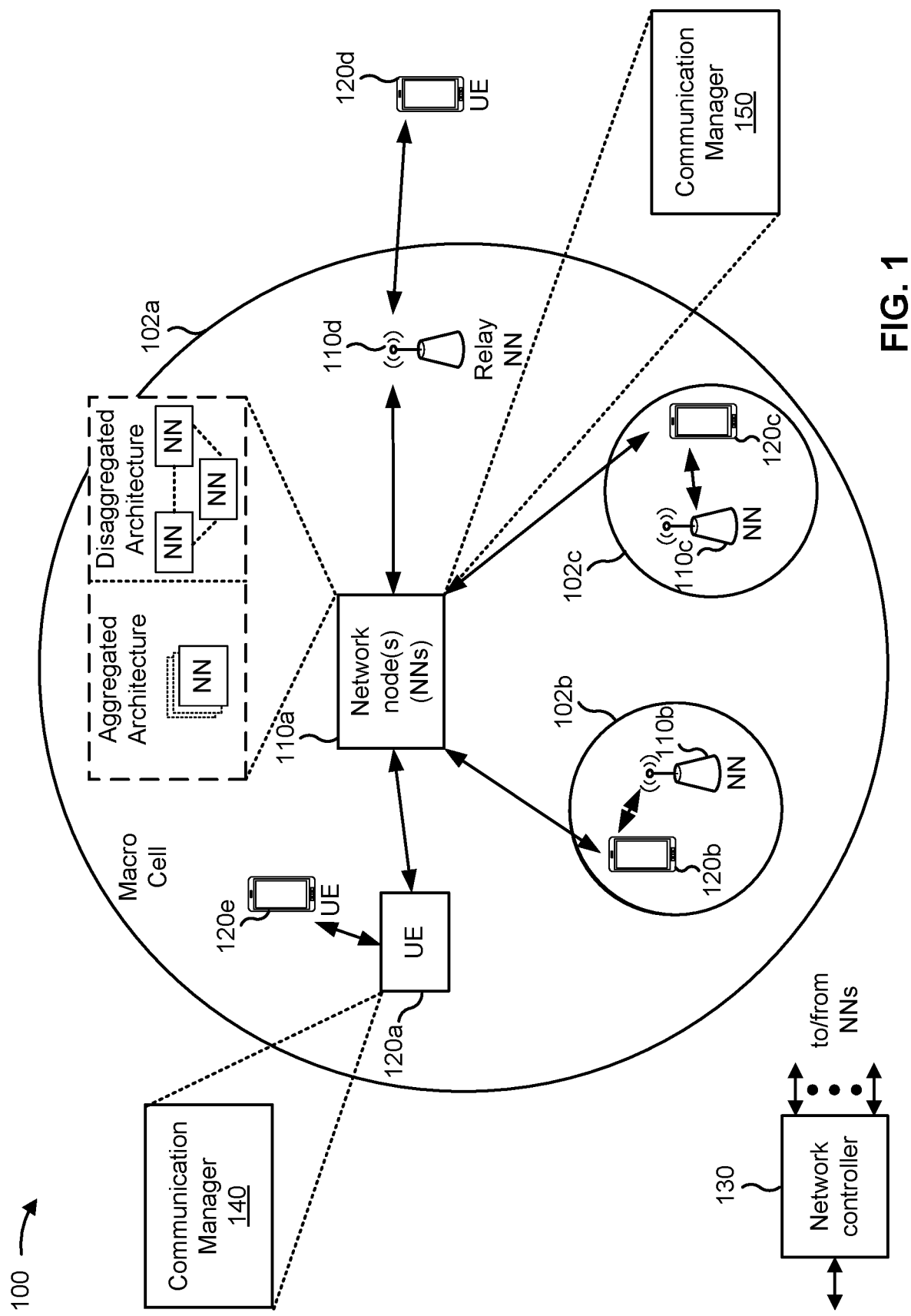
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit capability information indicative of a capability of the UE to support one or more subband full-duplex (SBFD) configuration types of a plurality of SBFD configuration types; and receive configuration information indicative of an SBFD configuration having at least one SBFD configuration type of the one or more SBFD configuration types. Additionally, or alternatively, the communication manager 140 may perform one or more other operations described herein.

In some aspects, the network node 110 may include a communication manager 150. As described in more detail elsewhere herein, the communication manager 150 may receive, from a UE, capability information indicative of a capability of the UE to support one or more SBFD configuration types of a plurality of SBFD configuration types; and transmit, to the UE, configuration information indicative of an SBFD configuration having an SBFD configuration type of the one or more SBFD configuration types. Additionally, or alternatively, the communication manager 150 may perform one or more other operations described herein.

As indicated above, FIG. 1 is provided as an example. Other examples may differ from what is described with regard to FIG. 1.

Figure 2:
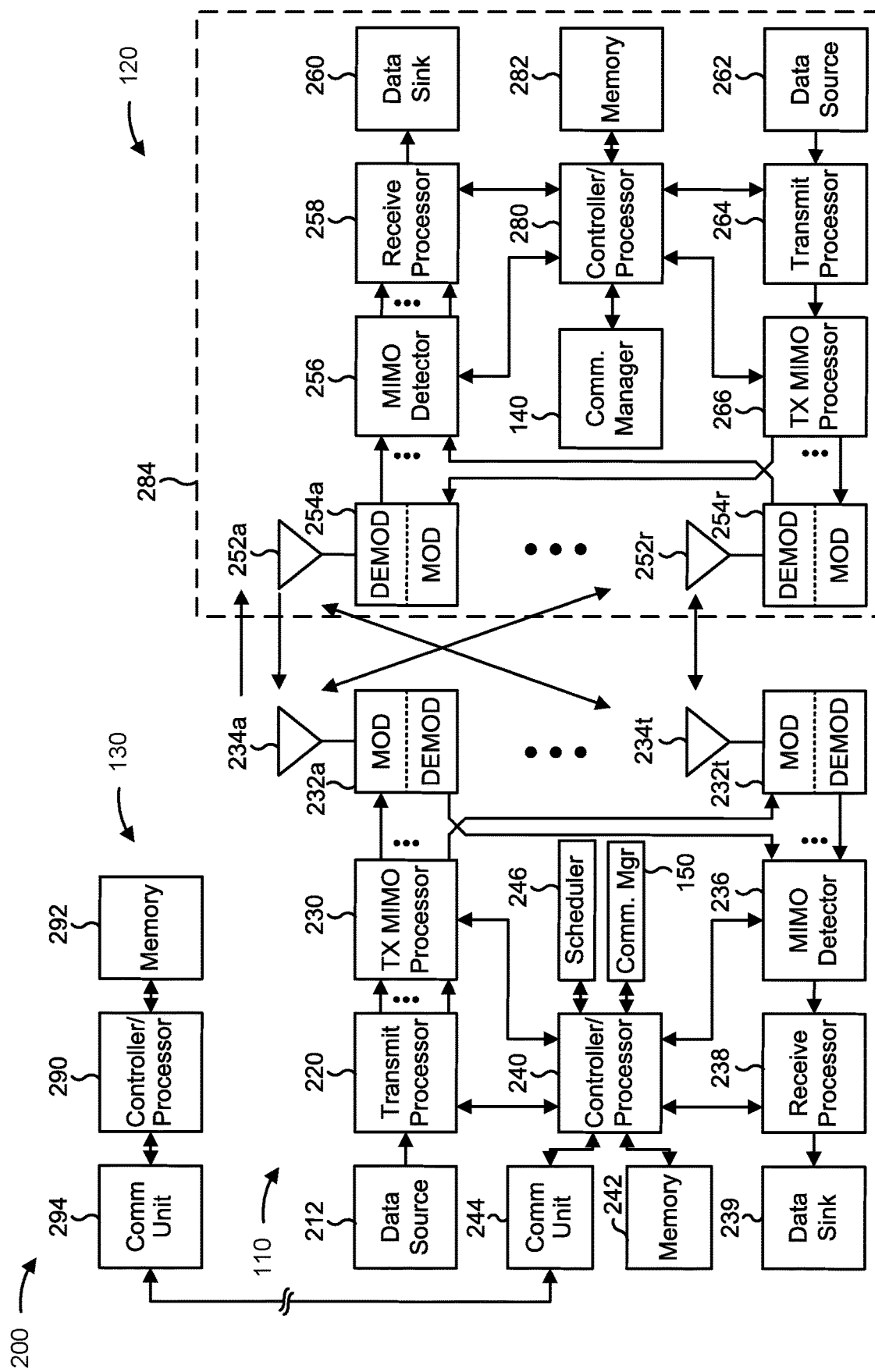
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the network node 110, the controller/processor 280 of the UE 120, and/or any other component(s) of FIG. 2 may perform one or more techniques associated with indicating UE capability information associated with SBFD configuration types, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting capability information indicative of a capability of the UE to support one or more SBFD configuration types of a plurality of SBFD configuration types; and/or means for receiving configuration information indicative of an SBFD configuration having at least one SBFD configuration type of the one or more SBFD configuration types. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving, from a UE, capability information indicative of a capability of the UE to support one or more SBFD configuration types of a plurality of SBFD configuration types; and/or means for transmitting, to the UE, configuration information indicative of an SBFD configuration having an SBFD configuration type of the one or more SBFD configuration types. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an JAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
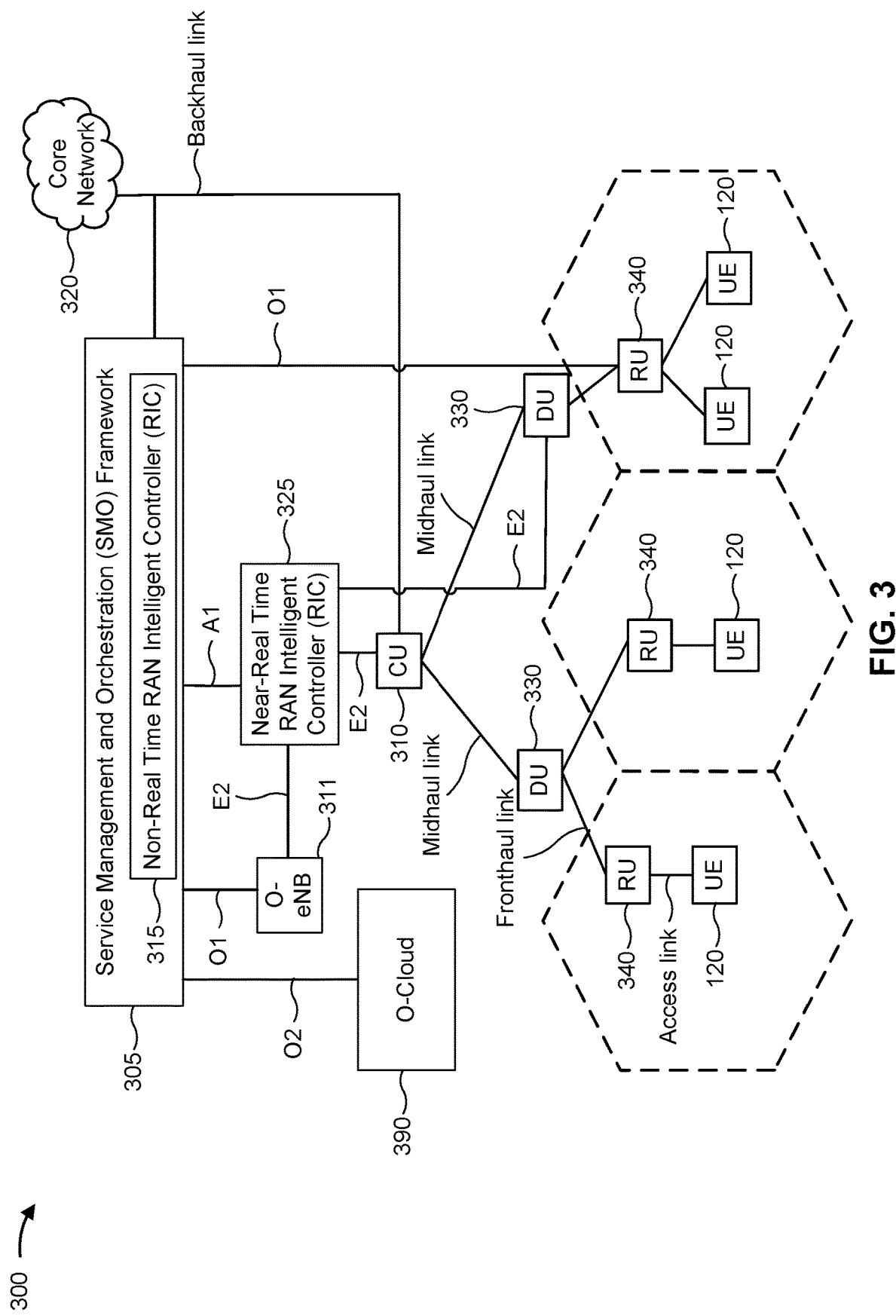
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
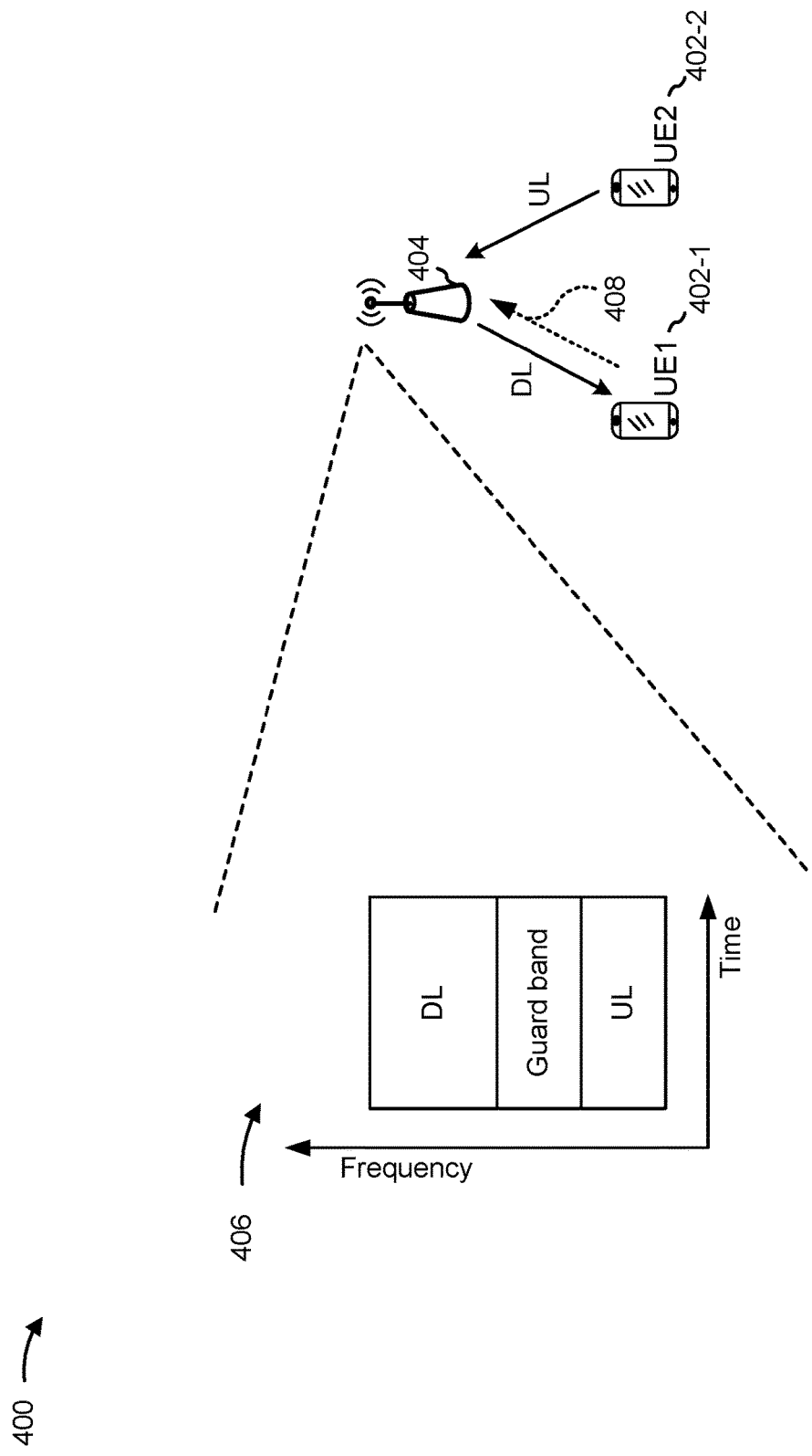
FIG. 4 is a diagram illustrating an example of full-duplex communication, in accordance with the present disclosure.

FIG. 4 is a diagram illustrating an example 400 of full-duplex (FD) communication, in accordance with the present disclosure. Example 400 includes two UEs, shown as UE1 402-1 and UE2 402-2, and a network node 404, where the UE1 402-1 is receiving a downlink transmission from the network node 404 and the UE2 402-2 is transmitting an uplink transmission to the network node 404. Full duplex is enabled for the network node 404, but not necessarily for UE1 402-1 and UE2 402-2 (e.g., the UE1 402-1 and/or the UE2 402-2 may be operating in a half-duplex communication mode).

The network node 404 may operate in an SBFD mode. The SBFD mode may also be referred to as a subband frequency division duplex mode or a flexible duplex mode. In the SBFD mode, the network node 404 can transmit and receive at a same time. For example, the network node 404 can transmit and receive on different frequency domain resources. For example, in a full-duplex communication 406, a downlink (DL) resource may be separated from an uplink (UL) resource by a guard band in a frequency domain. However, in some cases, a wireless communication standard can support only one active DL bandwidth part (BWP) and one active UL BWP. In some cases, the wireless communication standard can support only one slot pattern on all BWP configurations for a component carrier (CC). Additionally, in some cases, a wireless communication standard can define a BWP only for one of a DL BWP or an UL BWP. In some cases, a network node can be configured to communicate using SBFD configurations of one or more different configuration types. However, without awareness of the SBFD configurations supported by a UE, a network node (e.g., the network node 404) can be unable to utilize SBFD configurations effectively, thereby leading to inefficient communication and/or an inability to increase a UL duty cycle, thereby negatively impacting network performance.

Some aspects of the techniques and apparatus described herein may provide for indicating UE capability information associated with SBFD configuration types. For example, in some aspects, a UE may transmit capability information indicative of a capability of the UE to support one or more SBFD configuration types of a plurality of SBFD configuration types. For example, as shown by reference number 408, the UE1 402-1 may transmit, and the network node 404 may receive, capability information indicative of a capability of the UE to support one or more SBFD configuration types of a plurality of SBFD configuration types. The network node 404 may transmit, and the UE1 402-1 may receive, configuration information indicative of an SBFD configuration having at least one SBFD configuration type of the one or more SBFD configuration types. In this way, some aspects can facilitate an increase in a UL duty cycle, leading to latency reduction, (e.g., it is possible to receive DL signals in UL only slots, which can enable latency savings), UL coverage improvement, enhanced system capacity, enhanced resource utilization, enhanced spectrum efficiency, and/or flexible and dynamic UL/DL resource adaption according to UL/DL traffic in a robust manner, among other examples. As a result, some aspects of the techniques and apparatuses described herein may positively impact network performance.

As indicated above, FIG. 4 is provided as an example. Other examples may differ from what is described with regard to FIG. 4.

Figure 5:
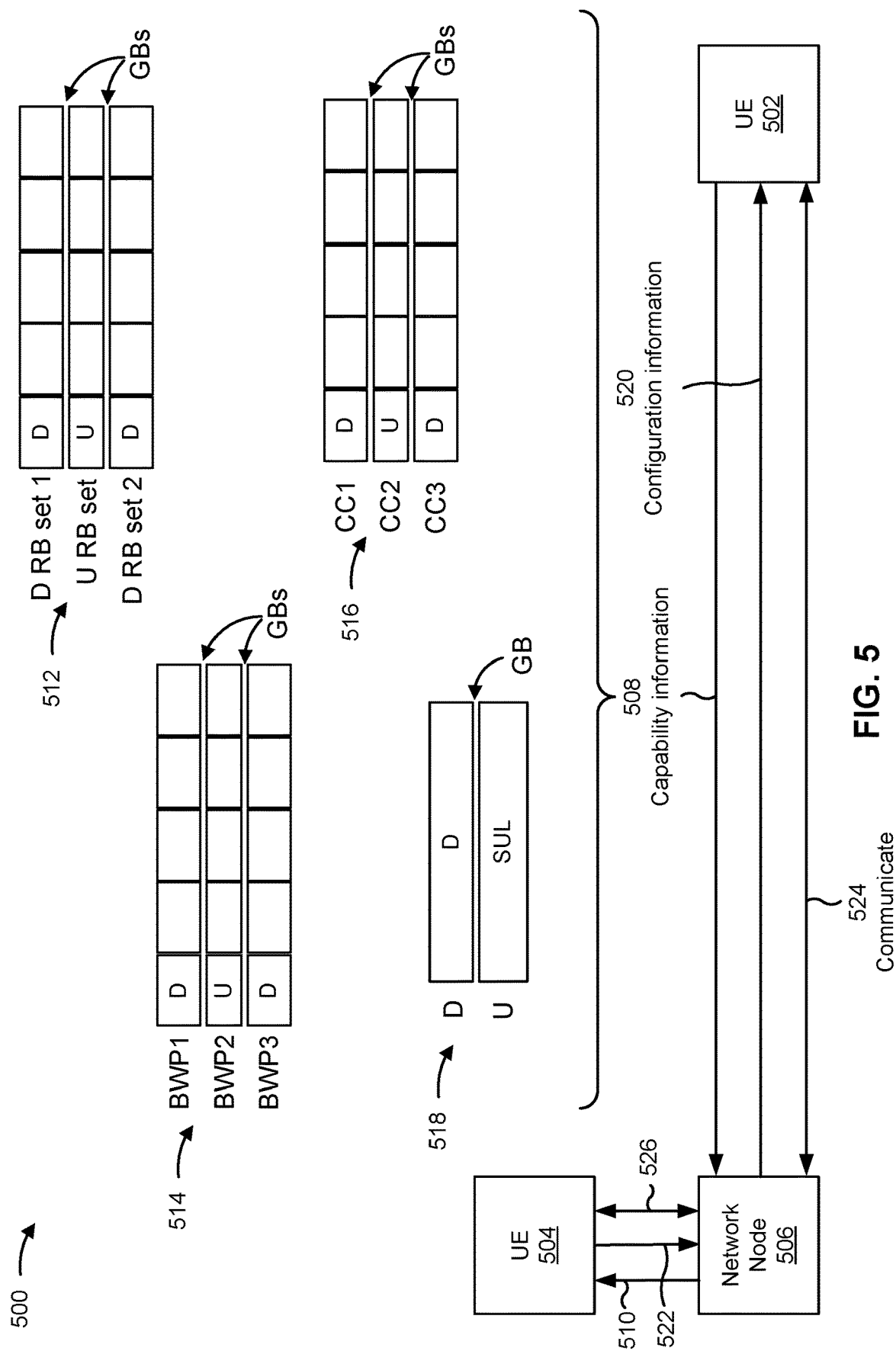
FIG. 5 is a diagram illustrating an example associated with indicating UE capability information associated with subband full duplex (SBFD) configuration types, in accordance with the present disclosure.

FIG. 5 is a diagram illustrating an example 500 associated with indicating UE capability information associated with SBFD configuration types, in accordance with the present disclosure. As shown, example 500 includes a UE 502, a UE 504, and a network node 506 in communication with one another. In some aspects, the UE 502 and/or the UE 504 may be, be similar to, include, or be included in, the UE 120 depicted in FIGS. 1-3, the UE1 402-1 depicted in FIG. 4, and/or the UE2 402-2 depicted in FIG. 4. In some aspects, the network node 506 may be, be similar to, include, or be included in, the network node 110 depicted in FIGS. 1-3 and/or the network node 404 depicted in FIG. 4.

As shown by reference number 508, the UE 502 may transmit, and the network node 506 may receive, capability information indicative of a capability of the UE 502 to support one or more SBFD configuration types of a plurality of SBFD configuration types. Similarly, as shown by reference number 510, the UE 504 may transmit, and the network node 506 may receive, capability information indicative of a capability of the UE 504 to support one or more SBFD configuration types of the plurality of SBFD configuration types. In some aspects, the capability information may be indicative of a quantity of SBFD configuration types that are supported by the respective UE 502 and/or 504.

In some aspects, the one or more SBFD configuration types supported by the UE may include a resource block (RB) set based SBFD configuration type. In some aspects, the RB set based SBFD configuration may indicate a first set of RBs associated with a downlink subband configuration and a second set of RBs associated with an uplink subband configuration. In some aspects, additional subband configurations may be associated with additional sets of RBs. For example, as shown by reference number 512, the RB set based SBFD configuration type may correspond to an SBFD configuration that indicates a first set of downlink RBs ("D RB set 1") associated with a first downlink subband configuration, a second set of downlink RBs ("D RB set 2") associated with a second downlink subband configuration, and a set of uplink RBs ("U RB set") associated with an uplink subband configuration disposed between the first downlink subband and the second downlink subband.

In some aspects, the subband configurations may be different than those illustrated. For example, in some aspects, the RB set based SBFD configuration type may correspond to an SBFD configuration that indicates a first set of uplink RBs associated with a first uplink subband configuration, a second set of uplink RBs, and a set of downlink RBs associated with a downlink subband configuration disposed between the first uplink subband and the second uplink subband.

In some aspects, each subband may be configured with a slot format configuration. In some aspects, each subband may be configured with a different slot format configuration. A slot format configuration may include a combination of downlink ("D") slots and/or symbols, uplink ("U") slots and/or symbols, or SBFD slots and/or symbols. An SBFD slot may include one or more downlink time/frequency resources and one or more uplink time/frequency resources. A downlink time/frequency resource in the SBFD slot may be separated (for example, in time or frequency) from an uplink time/frequency resource in the SBFD slot by a gap, which may function to reduce self-interference and improve latency and uplink coverage. For example, the gap may be a frequency offset or a frequency gap between downlink time/frequency resources and uplink time/frequency resources in the same SBFD slot. For example, a network node may be operating in an SBFD mode (for example, transmitting and receiving at the same time on different frequency domain resources). The network node may schedule a first UE to receive a downlink communication in an SBFD slot. The network node may schedule a second UE to transmit an uplink communication in the same SBFD slot.

In some aspects, the one or more SBFD configuration types supported by the UE may include a bandwidth part (BWP) based SBFD configuration type. In some aspects, the BWP based SBFD configuration may indicate a first BWP associated with a downlink subband configuration and a second BWP associated with an uplink subband configuration. In some aspects, additional subband configurations may be associated with additional BWPs. For example, as shown by reference number 514, the BWP based SBFD configuration type may correspond to an SBFD configuration that indicates a first BWP ("BWP1") associated with a first downlink subband configuration, a second BWP ("BWP2") associated with an uplink subband configuration, and a third BWP ("BWP3") associated with a second downlink subband configuration, where the uplink subband is disposed between the first downlink subband and the second downlink subband.

In some aspects, the subband configurations may be different than those illustrated. For example, in some aspects, the BWP based SBFD configuration type may correspond to an SBFD configuration that indicates a first BWP associated with a first uplink subband configuration, a second BWP associated with a downlink subband configuration, and a third BWP associated with a second uplink subband configuration, where the downlink subband is disposed between the first uplink subband and the second uplink subband. In some aspects, each subband may be configured with a slot format configuration. In some aspects, each subband may be configured with a different slot format configuration.

In some aspects, the one or more SBFD configuration types supported by the UE may include at least one intra-band carrier aggregation (CA) based SBFD configuration type. The at least one intra-band CA based SBFD configuration type may include at least one of a first intra-band CA based SBFD configuration subtype, a second intra-band CA based SBFD configuration subtype, or a third intra-band CA based SBFD configuration subtype. The first intra-band CA based SBFD configuration subtype may correspond to an SBFD configuration that indicates a first CC associated with an uplink subband and a second CC associated with a downlink subband. As shown by reference number 516, for example, the first intra-band CA based SBFD configuration subtype may correspond to an SBFD configuration that indicates a first CC ("CC1") associated with a first downlink subband, a second CC ("CC2") associated with an uplink subband, and a third CC ("CC3") associated with a second downlink subband, where the uplink subband is disposed between the first downlink subband and the second downlink subband. In some aspects, the first uplink subband and the first downlink subband may be arranged relative to one another according to a first subband configuration, and the second uplink subband and the second downlink subband may be arranged relative to one another according to a second subband configuration.

In some aspects, the second intra-band CA based SBFD configuration subtype may correspond to an SBFD configuration that indicates a first uplink subband associated with a first component carrier and a first downlink subband associated with the first component carrier. The second intra-band CA based SBFD configuration subtype may correspond to an SBFD configuration that indicates a first set of subbands associated with a first component carrier and a second set of subbands associated with a second component carrier, as is illustrated in FIG. 6.

For example, in some aspects, the first set of subbands may include at least two subbands arranged according to a first subband configuration, and the second set of subbands may include at least two subbands arranged according to a second subband configuration. In some aspects, the first subband configuration may indicate a first uplink subband and a first downlink subband, and the second subband configuration indicates a second uplink subband and a second downlink subband. In some aspects, at least one of the first subband configuration or the second subband configuration may indicate a first downlink subband, a second downlink subband, and an uplink subband disposed between the first downlink subband and the second downlink subband.

In some aspects, the third intra-band CA based SBFD configuration subtype may correspond to an SBFD configuration that indicates at least one subband associated with at least two component carriers, as is illustrated in FIG. 7.

In some aspects, the one or more SBFD configuration types may include a supplemental uplink (SUL) based SBFD configuration type. The SUL based SBFD configuration type may correspond to an SBFD configuration that indicates an uplink subband corresponding to an SUL configuration. For example, as shown by reference number 518, an SUL SBFD configuration type may correspond to an SBFD configuration that indicates a downlink subband corresponding to a downlink symbol and/or slot and an uplink subband corresponding to an SUL symbol and/or slot.

As shown by reference number 520, the network node 506 may transmit, and the UE 502 may receive, configuration information indicative of an SBFD configuration having an SBFD configuration type of the one or more SBFD configuration types indicated as being supported by the UE 502. As shown by reference number 522, the network node 506 may transmit, and the UE 504 may receive, configuration information indicative of an SBFD configuration having an SBFD configuration type of the one or more SBFD configuration types indicated as being supported by the UE 504.

In some aspects, the configuration information transmitted to the UE 502 may indicate the same SBFD configuration as an SBFD configuration that is indicated by the configuration information transmitted to the UE 504. In some other aspects, the configuration information transmitted to the UE 502 may indicate a different SBFD configuration than an SBFD configuration that is indicated by the configuration information transmitted to the UE 504. In some aspects, the SBFD configuration or configurations may correspond to full-duplex operations by the network node 506. The UE 502 and the UE 504 may be configured for half-duplex operation. For example, the SBFD configuration may configure the UE 502 and/or the UE 504 for downlink half-duplex communications.

As shown by reference number 524, the UE 502 and the network node 506 may communicate with one another based on the SBFD configuration indicated by the configuration information transmitted to the UE 502. As shown by reference number 526, the UE 504 and the network node 506 may communicate with one another based on the SBFD configuration indicated by the configuration information transmitted to the UE 504.

As indicated above, FIG. 5 is provided as an example. Other examples may differ from what is described with regard to FIG. 5.

Figure 6A:
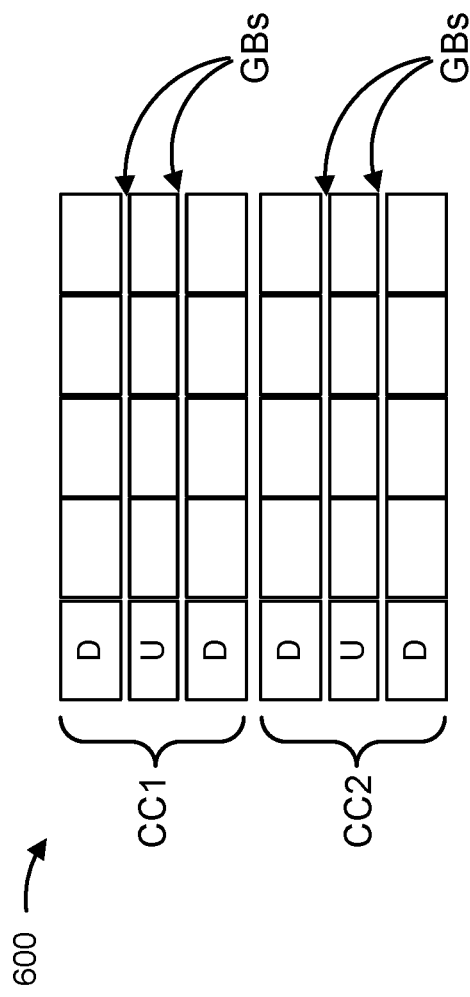
FIGS. 6A and 6B are diagrams illustrating examples of an SBFD slot, in accordance with the present disclosure.
Figure 6B:
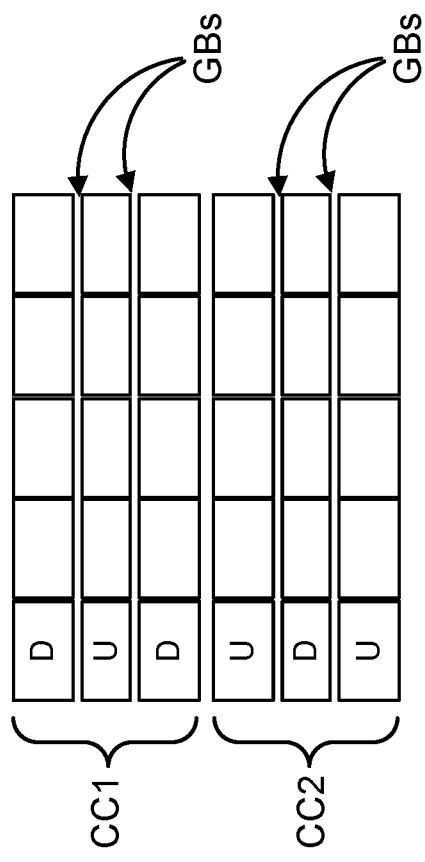

FIGS. 6A and 6B are diagrams illustrating examples 600 and 602 of an SBFD slot, in accordance with the present disclosure. In some aspects, the SBFD slot of examples 600 and 602 may be configured using a CC-based SBFD configuration, as described in connection with FIG. 5.

As shown by examples 600 and 602, a first CC ("CC1") may be associated with a set of uplink and downlink subbands and a second CC ("CC2") may be associated with a second set of uplink and downlink subbands. Guard bands may be disposed between each subband. Each set of uplink and downlink subbands may be arranged according to a subband configuration. In some aspects, as shown in example 600, the subband configuration of the first set of uplink and downlink subbands may be the same as the subband configuration of the second set of uplink and downlink subbands. For example, as shown, each set of uplink and downlink subbands may include two downlink subbands with an uplink subband disposed between them. As shown in example 602, the subband configuration of the first set of uplink and downlink subbands may be different from the subband configuration of the second set of uplink and downlink subbands. For example, as shown, the first set of uplink and downlink subbands may include two downlink subbands with an uplink subband disposed between them, whereas the second set of uplink and downlink subbands may include two uplink subbands with a downlink subband disposed between them.

Although only two CCs are shown in FIGS. 6A and 6B, any number of different CCs may be configured with corresponding sets of uplink and downlink subbands. In some aspects, each downlink and uplink subband may be configured with any number of different slot format configurations.

As indicated above, FIGS. 6A and 6B are provided as examples. Other examples may differ from what is described with regard to FIGS. 6A and 6B.

Figure 7A:
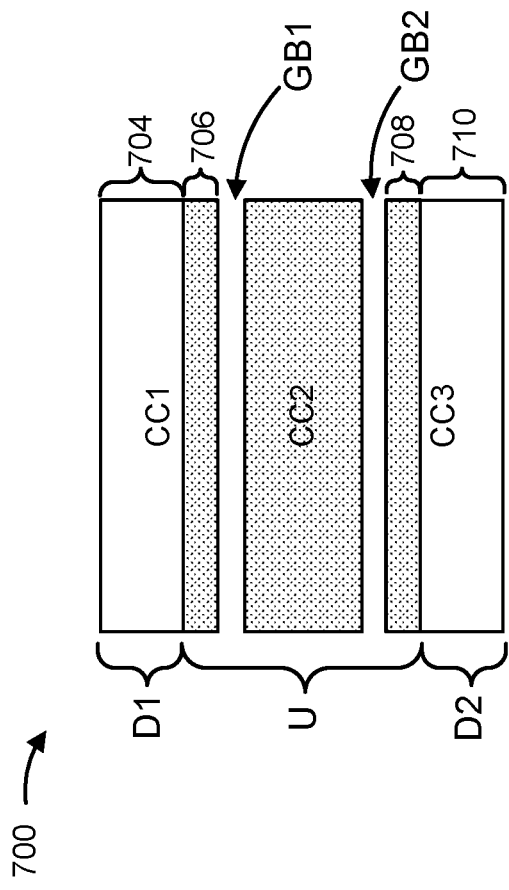
FIGS. 7A and 7B are diagrams illustrating examples of an SBFD slot, in accordance with the present disclosure.
Figure 7B:
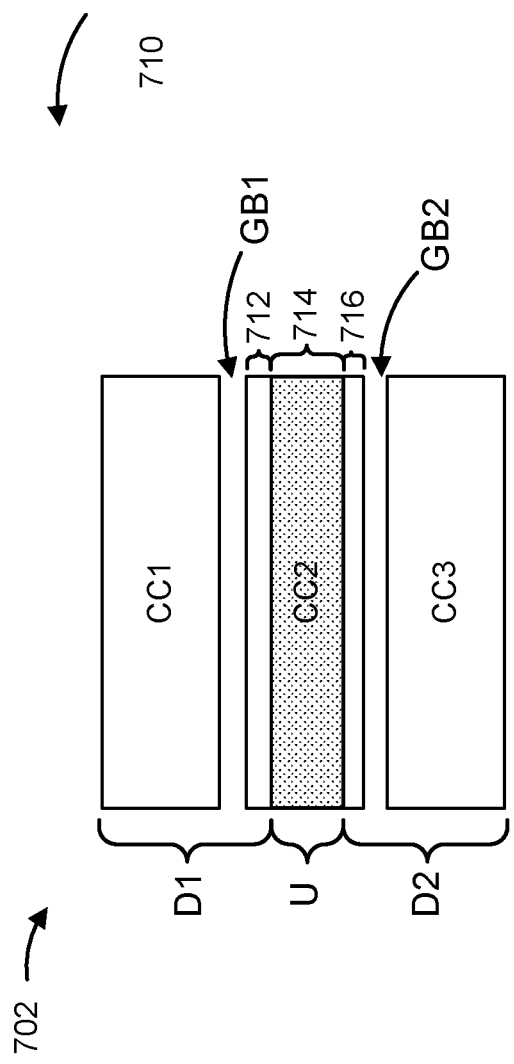

FIGS. 7A and 7B are diagrams illustrating examples 700 and 702 of an SBFD slot, in accordance with the present disclosure. In some aspects, the SBFD slot of examples 700 and 702 may be configured using a CC-based SBFD configuration, as described in connection with FIG. 5.

As shown by examples 700 and 702, at least one subband may be associated with at least two component carriers. By scaling the SBFD configuration within a time domain duplexing (TDD) carrier across multiple CCs, as shown in FIGS. 7A and 7B, flexible UL/DL subband configurations may be used and may enable utilization of inter-channel guard bands.

For example, as shown in example 700, a first downlink subband ("D1") may be associated with a first portion 704 of a first component carrier ("CC1") and an uplink subband ("U") may be associated with a second portion 706 of the first component carrier. The uplink subband may be further associated with a second component carrier ("CC2") and a first portion 708 of a third component carrier ("CC3"). A second downlink subband ("D2") may be associated with a second portion 710 of the third component carrier. As shown, a first guard band ("GB1") may be associated with the uplink subband and may be disposed between the first component carrier and the second component carrier. A second guard band ("BG2") may be associated with the uplink subband and may be disposed between the second component carrier and the third component carrier.

As shown in example 702, a first downlink subband ("D1") may be associated with a first component carrier ("CC1") and a first portion 712 of a second component carrier ("CC2"). An uplink subband ("U") may be associated with a second portion 714 of the second component carrier, and a second downlink subband ("D2") may be associated with a third portion 716 of the second component carrier. The second downlink subband may be further associated with a third component carrier ("CC3"). A first guard band ("GB1") may be associated with the first downlink subband and may be disposed between the first component carrier and the second component carrier, and a second guard band ("GB2") may be associated with the second downlink subband and may be disposed between the second component carrier and the third component carrier.

As indicated above, FIGS. 7A and 7B are provided as examples. Other examples may differ from what is described with regard to FIGS. 7A and 7B.

Figure 8:
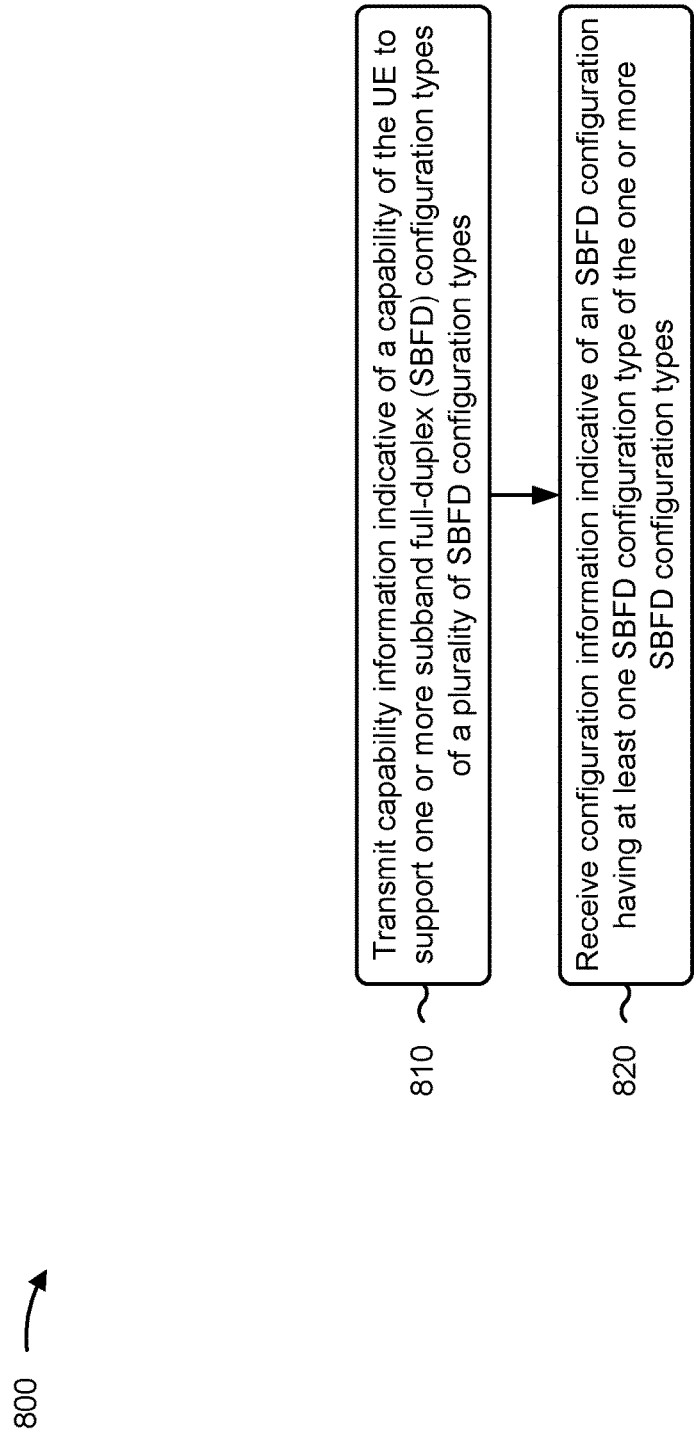
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 502 and/or 504) performs operations associated with indicating UE capability information associated with SBFD configuration types.

As shown in FIG. 8, in some aspects, process 800 may include transmitting capability information indicative of a capability of the UE to support one or more SBFD configuration types of a plurality of SBFD configuration types (block 810). For example, the UE (e.g., using communication manager 1008 and/or transmission component 1004, depicted in FIG. 10) may transmit capability information indicative of a capability of the UE to support one or more SBFD configuration types of a plurality of SBFD configuration types, as described above.

As further shown in FIG. 8, in some aspects, process 800 may include receiving configuration information indicative of an SBFD configuration having at least one SBFD configuration type of the one or more SBFD configuration types (block 820). For example, the UE (e.g., using communication manager 1008 and/or reception component 1002, depicted in FIG. 10) may receive configuration information indicative of an SBFD configuration having at least one SBFD configuration type of the one or more SBFD configuration types, as described above.

Process 800 may include additional aspects, such as any single aspect or any combination of aspects described below and/or in connection with one or more other processes described elsewhere herein.

In a first aspect, the capability information is indicative of a quantity of SBFD configuration types that are supported by the UE. In a second aspect, alone or in combination with the first aspect, the one or more SBFD configuration types include an RB set based SBFD configuration type. In a third aspect, alone or in combination with the second aspect, the RB set based SBFD configuration type corresponds to an SBFD configuration that indicates a first set of RBs associated with a downlink subband and a second set of RBs associated with an uplink subband. In a fourth aspect, alone or in combination with one or more of the second or third aspects, the RB set based SBFD configuration type corresponds to an SBFD configuration that indicates a first set of RBs associated with a first downlink subband, a second set of RBs associated with a second downlink subband, and a third set of RBs associated with an uplink subband disposed between the first downlink subband and the second downlink subband.

In a fifth aspect, alone or in combination with one or more of the first through fourth aspects, the one or more SBFD configuration types include a BWP based SBFD configuration type. In a sixth aspect, alone or in combination with the fifth aspect, the BWP based SBFD configuration type corresponds to an SBFD configuration that indicates a first BWP associated with a downlink subband and a second BWP associated with an uplink subband. In a seventh aspect, alone or in combination with one or more of the fifth or sixth aspects, the BWP based SBFD configuration type corresponds to an SBFD configuration that indicates a first BWP associated with a first downlink subband, a second BWP associated with an uplink subband, and a third BWP associated with a second downlink subband, wherein the uplink subband is disposed between the first downlink subband and the second downlink subband.

In an eighth aspect, alone or in combination with one or more of the first through seventh aspects, the one or more SBFD configuration types include at least one intra-band CA based SBFD configuration type. In a ninth aspect, alone or in combination with the eighth aspect, the at least one intra-band CA based SBFD configuration type comprises at least one of a first intra-band CA based SBFD configuration subtype, a second intra-band CA based SBFD configuration subtype, or a third intra-band CA based SBFD configuration subtype. In a tenth aspect, alone or in combination with the ninth aspect, the first intra-band CA based SBFD configuration subtype corresponds to an SBFD configuration that indicates a first component carrier associated with an uplink subband and a second component carrier associated with a downlink subband.

In an eleventh aspect, alone or in combination with one or more of the ninth or tenth aspects, the first intra-band CA based SBFD configuration subtype corresponds to an SBFD configuration that indicates a first component carrier associated with a first downlink subband, a second component carrier associated with an uplink subband, and a third component carrier associated with a second downlink subband, wherein the uplink subband is disposed between the first downlink subband and the second downlink subband. In a twelfth aspect, alone or in combination with one or more of the ninth through eleventh aspects, the second intra-band CA based SBFD configuration subtype corresponds to an SBFD configuration that indicates a first set of subbands associated with a first component carrier and a second set of subbands associated with a second component carrier. In a thirteenth aspect, alone or in combination with the twelfth aspect, the first set of subbands comprises at least two subbands arranged according to a first subband configuration, and the second set of subbands comprises at least two subbands arranged according to a second subband configuration.

In a fourteenth aspect, alone or in combination with the thirteenth aspect, the first subband configuration indicates a first uplink subband and a first downlink subband, and the second subband configuration indicates a second uplink subband and a second downlink subband. In a fifteenth aspect, alone or in combination with one or more of the thirteenth or fourteenth aspects, at least one of the first subband configuration or the second subband configuration indicates a first downlink subband, a second downlink subband, and an uplink subband disposed between the first downlink subband and the second downlink subband. In a sixteenth aspect, alone or in combination with one or more of the thirteenth through fifteenth aspects, the first subband configuration corresponds to the second subband configuration. In a seventeenth aspect, alone or in combination with one or more of the thirteenth through fifteenth aspects, the first subband configuration is different than the second subband configuration.

In an eighteenth aspect, alone or in combination with one or more of the ninth through seventeenth aspects, the third intra-band CA based SBFD configuration subtype corresponds to an SBFD configuration that indicates at least one subband associated with at least two component carriers. In a nineteenth aspect, alone or in combination with the eighteenth aspect, the at least one subband comprises a first downlink subband associated with a first portion of a first component carrier of the at least two component carriers, an uplink subband associated with a second portion of the first component carrier, wherein the uplink subband is further associated with a second component carrier of the at least two component carriers and a first portion of a third component carrier of the at least two component carriers, and a second downlink subband associated with a second portion of the third component carrier.

In a twentieth aspect, alone or in combination with the nineteenth aspect, a first guard band is associated with the uplink subband and is disposed between the first component carrier and the second component carrier, and a second guard band is associated with the uplink subband and is disposed between the second component carrier and the third component carrier. In a twenty-first aspect, alone or in combination with the eighteenth aspect, the at least one subband comprises a first downlink subband associated with a first component carrier of the at least two component carriers and a first portion of a second component carrier of the at least two component carriers, an uplink subband associated with a second portion of the second component carrier, and a second downlink subband associated with a third portion of the second component carrier, wherein the second downlink subband is further associated with a third component carrier of the at least two component carriers. In a twenty-second aspect, alone or in combination with the twenty-first aspect, a first guard band is associated with the first downlink subband and is disposed between the first component carrier and the second component carrier, and a second guard band is associated with the second downlink subband and is disposed between the second component carrier and the third component carrier.

In a twenty-third aspect, alone or in combination with one or more of the first through twenty-second aspects, the one or more SBFD configuration types include a SUL based SBFD configuration type. In a twenty-fourth aspect, alone or in combination with the twenty-third aspect, the SUL based SBFD configuration type corresponds to an SBFD configuration that indicates an uplink subband corresponding to an SUL configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
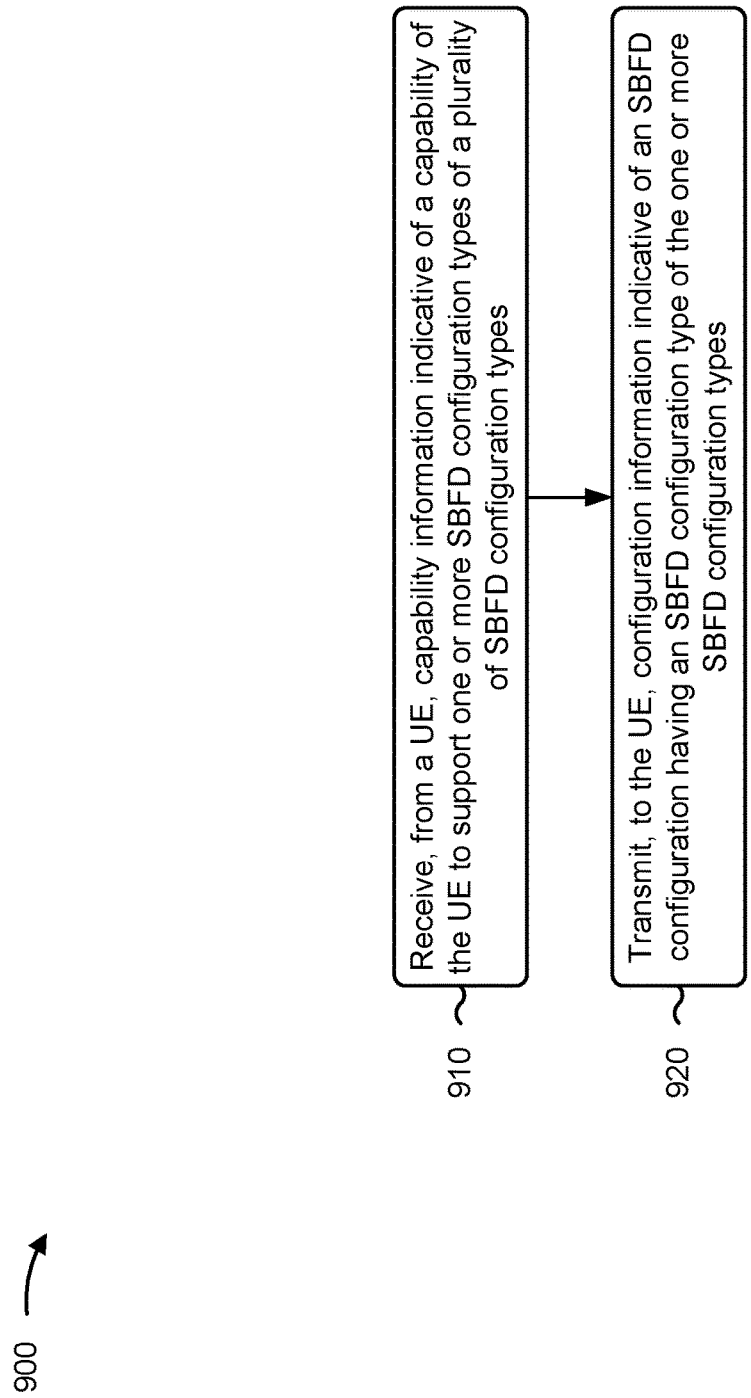
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 506) performs operations associated with indicating UE capability information associated with SBFD configuration types.

As shown in FIG. 9, in some aspects, process 900 may include receiving, from a UE, capability information indicative of a capability of the UE to support one or more SBFD configuration types of a plurality of SBFD configuration types (block 910). For example, the network node (e.g., using communication manager 1108 and/or reception component 1102, depicted in FIG. 11) may receive, from a UE, capability information indicative of a capability of the UE to support one or more SBFD configuration types of a plurality of SBFD configuration types, as described above.

As further shown in FIG. 9, in some aspects, process 900 may include transmitting, to the UE, configuration information indicative of an SBFD configuration having an SBFD configuration type of the one or more SBFD configuration types (block 920). For example, the network node (e.g., using communication manager 1108 and/or transmission component 1104, depicted in FIG. 11) may transmit, to the UE, configuration information indicative of an SBFD configuration having an SBFD configuration type of the one or more SBFD configuration types, as described above.

Process 900 may include additional aspects, such as any single aspect or any combination of aspects described below and/or in connection with one or more other processes described elsewhere herein.

In a first aspect, the capability information is indicative of a quantity of SBFD configuration types that are supported by the UE. In a second aspect, alone or in combination with the first aspect, the one or more SBFD configuration types include an RB set based SBFD configuration type. In a third aspect, alone or in combination with the second aspect, the RB set based SBFD configuration type corresponds to an SBFD configuration that indicates a first set of RBs associated with a downlink subband and a second set of RBs associated with an uplink subband. In a fourth aspect, alone or in combination with one or more of the second or third aspects, the RB set based SBFD configuration type corresponds to an SBFD configuration that indicates a first set of RBs associated with a first downlink subband, a second set of RBs associated with a second downlink subband, and a third set of RBs associated with an uplink subband disposed between the first downlink subband and the second downlink subband.

In a fifth aspect, alone or in combination with one or more of the first through fourth aspects, the one or more SBFD configuration types include a BWP based SBFD configuration type. In a sixth aspect, alone or in combination with the fifth aspect, the BWP based SBFD configuration type corresponds to an SBFD configuration that indicates a first BWP associated with a downlink subband and a second BWP associated with an uplink subband. In a seventh aspect, alone or in combination with one or more of the fifth or sixth aspects, the BWP based SBFD configuration type corresponds to an SBFD configuration that indicates a first BWP associated with a first downlink subband, a second BWP associated with an uplink subband, and a third BWP associated with a second downlink subband, wherein the uplink subband is disposed between the first downlink subband and the second downlink subband.

In an eighth aspect, alone or in combination with one or more of the first through seventh aspects, the one or more SBFD configuration types include at least one intra-band CA based SBFD configuration type. In a ninth aspect, alone or in combination with the eighth aspect, the at least one intra-band CA based SBFD configuration type comprises at least one of a first intra-band CA based SBFD configuration subtype, a second intra-band CA based SBFD configuration subtype, or a third intra-band CA based SBFD configuration subtype. In a tenth aspect, alone or in combination with the ninth aspect, the first intra-band CA based SBFD configuration subtype corresponds to an SBFD configuration that indicates a first component carrier associated with an uplink subband and a second component carrier associated with a downlink subband.

In an eleventh aspect, alone or in combination with one or more of the ninth or tenth aspects, the first intra-band CA based SBFD configuration subtype corresponds to an SBFD configuration that indicates a first component carrier associated with a first downlink subband, a second component carrier associated with an uplink subband, and a third component carrier associated with a second downlink subband, wherein the uplink subband is disposed between the first downlink subband and the second downlink subband. In a twelfth aspect, alone or in combination with one or more of the ninth through eleventh aspects, the second intra-band CA based SBFD configuration subtype corresponds to an SBFD configuration that indicates a first set of subbands associated with a first component carrier and a second set of subbands associated with a second component carrier. In a thirteenth aspect, alone or in combination with the twelfth aspect, the first set of subbands comprises at least two subbands arranged according to a first subband configuration, and the second set of subbands comprises at least two subbands arranged according to a second subband configuration. In a fourteenth aspect, alone or in combination with the thirteenth aspect, the first subband configuration indicates a first uplink subband and a first downlink subband, and the second subband configuration indicates a second uplink subband and a second downlink subband.

In a fifteenth aspect, alone or in combination with one or more of the thirteenth or fourteenth aspects, at least one of the first subband configuration or the second subband configuration indicates a first downlink subband, a second downlink subband, and an uplink subband disposed between the first downlink subband and the second downlink subband. In a sixteenth aspect, alone or in combination with one or more of the thirteenth through fifteenth aspects, the first subband configuration corresponds to the second subband configuration. In a seventeenth aspect, alone or in combination with one or more of the thirteenth through sixteenth aspects, the first subband configuration is different than the second subband configuration. In an eighteenth aspect, alone or in combination with one or more of the ninth through seventeenth aspects, the third intra-band CA based SBFD configuration subtype corresponds to an SBFD configuration that indicates at least one subband associated with at least two component carriers.

In a nineteenth aspect, alone or in combination with the eighteenth aspect, the at least one subband comprises a first downlink subband associated with a first portion of a first component carrier of the at least two component carriers, an uplink subband associated with a second portion of the first component carrier, wherein the uplink subband is further associated with a second component carrier of the at least two component carriers and a first portion of a third component carrier of the at least two component carriers, and a second downlink subband associated with a second portion of the third component carrier. In a twentieth aspect, alone or in combination with the nineteenth aspect, a first guard band is associated with the uplink subband and is disposed between the first component carrier and the second component carrier, and a second guard band is associated with the uplink subband and is disposed between the second component carrier and the third component carrier. In a twenty-first aspect, alone or in combination with the eighteenth aspect, the at least one subband comprises a first downlink subband associated with a first component carrier of the at least two component carriers and a first portion of a second component carrier of the at least two component carriers, an uplink subband associated with a second portion of the second component carrier, and a second downlink subband associated with a third portion of the second component carrier, wherein the second downlink subband is further associated with a third component carrier of the at least two component carriers. In a twenty-second aspect, alone or in combination with the twenty-first aspect, a first guard band is associated with the first downlink subband and is disposed between the first component carrier and the second component carrier, and a second guard band is associated with the second downlink subband and is disposed between the second component carrier and the third component carrier.

In a twenty-third aspect, alone or in combination with one or more of the first through twenty-second aspects, the one or more SBFD configuration types include a SUL based SBFD configuration type. In a twenty-fourth aspect, alone or in combination with the twenty-third aspect, the SUL based SBFD configuration type corresponds to an SBFD configuration that indicates an uplink subband corresponding to an SUL configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
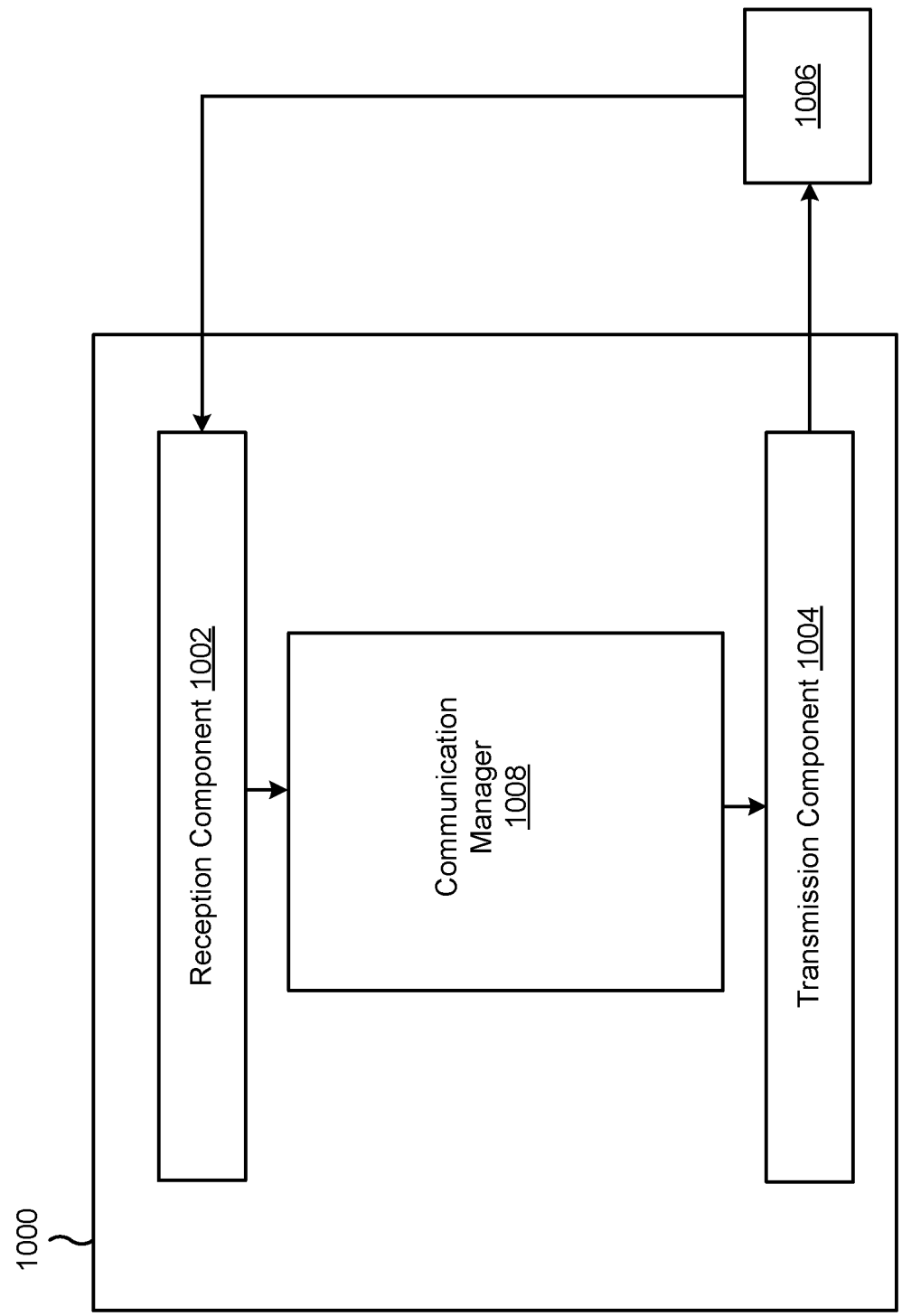
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1008 and/or the transmission component 1004 may transmit capability information indicative of a capability of the UE to support one or more SBFD configuration types of a plurality of SBFD configuration types. In some aspects, the communication manager 1008 may include one or more antennas, a modem, a controller/processor, a memory, or a combination thereof, of the UE described in connection with FIG. 2. In some aspects, the communication manager 1008 may include the reception component 1002 and/or the transmission component 1004. In some aspects, the communication manager 1008 may be, be similar to, include, or be included in, the communication manager 140 depicted in FIGS. 1 and 2. The communication manager 1008 and/or the reception component 1002 may receive configuration information indicative of an SBFD configuration having at least one SBFD configuration type of the one or more SBFD configuration types.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
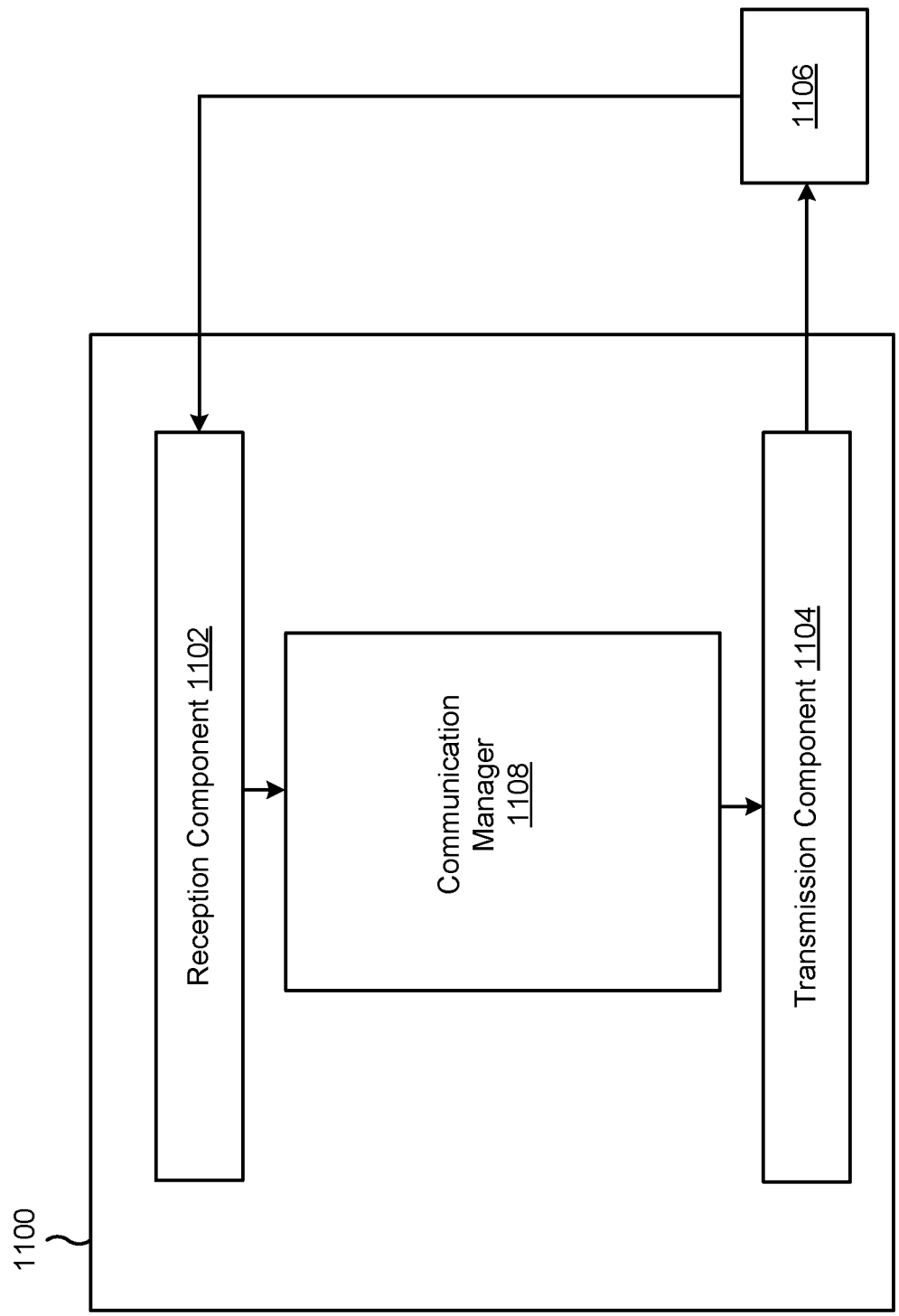
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The communication manager 1108 and/or the reception component 1102 may receive, from a UE, capability information indicative of a capability of the UE to support one or more SBFD configuration types of a plurality of SBFD configuration types. In some aspects, the communication manager 1108 may include one or more antennas, a modem, a controller/processor, a memory, or a combination thereof, of the UE described in connection with FIG. 2. In some aspects, the communication manager 1108 may include the reception component 1102 and/or the transmission component 1104. In some aspects, the communication manager 1108 may be, be similar to, include, or be included in, the communication manager 150 depicted in FIGS. 1 and 2. The communication manager 1108 and/or the transmission component 1104 may transmit, to the UE, configuration information indicative of an SBFD configuration having an SBFD configuration type of the one or more SBFD configuration types.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting capability information indicative of a capability of the UE to support one or more subband full-duplex (SBFD) configuration types of a plurality of SBFD configuration types; and receiving configuration information indicative of an SBFD configuration having at least one SBFD configuration type of the one or more SBFD configuration types.

Aspect 2: The method of Aspect 1, wherein the capability information is indicative of a quantity of SBFD configuration types that are supported by the UE.

Aspect 3: The method of either of Aspects 1 or 2, wherein the one or more SBFD configuration types include a resource block (RB) set based SBFD configuration type.

Aspect 4: The method of Aspect 3, wherein the RB set based SBFD configuration type corresponds to an SBFD configuration that indicates a first set of RBs associated with a downlink subband and a second set of RBs associated with an uplink subband.

Aspect 5: The method of either of Aspects 3 or 4, wherein the RB set based SBFD configuration type corresponds to an SBFD configuration that indicates a first set of RBs associated with a first downlink subband, a second set of RBs associated with a second downlink subband, and a third set of RBs associated with an uplink subband disposed between the first downlink subband and the second downlink subband.

Aspect 6: The method of any of Aspects 1-5, wherein the one or more SBFD configuration types include a bandwidth part (BWP) based SBFD configuration type.

Aspect 7: The method of Aspect 6, wherein the BWP based SBFD configuration type corresponds to an SBFD configuration that indicates a first BWP associated with a downlink subband and a second BWP associated with an uplink subband.

Aspect 8: The method of either of Aspects 6 or 7, wherein the BWP based SBFD configuration type corresponds to an SBFD configuration that indicates a first BWP associated with a first downlink subband, a second BWP associated with an uplink subband, and a third BWP associated with a second downlink subband, wherein the uplink subband is disposed between the first downlink subband and the second downlink subband.

Aspect 9: The method of any of Aspects 1-8, wherein the one or more SBFD configuration types include at least one intra-band carrier aggregation (CA) based SBFD configuration type.

Aspect 10: The method of Aspect 9, wherein the at least one intra-band CA based SBFD configuration type comprises at least one of a first intra-band CA based SBFD configuration subtype, a second intra-band CA based SBFD configuration subtype, or a third intra-band CA based SBFD configuration subtype.

Aspect 11: The method of Aspect 10, wherein the first intra-band CA based SBFD configuration subtype corresponds to an SBFD configuration that indicates a first component carrier associated with an uplink subband and a second component carrier associated with a downlink subband.

Aspect 12: The method of either of Aspects 10 or 11, wherein the first intra-band CA based SBFD configuration subtype corresponds to an SBFD configuration that indicates a first component carrier associated with a first downlink subband, a second component carrier associated with an uplink subband, and a third component carrier associated with a second downlink subband, wherein the uplink subband is disposed between the first downlink subband and the second downlink subband.

Aspect 13: The method of any of Aspects 10-12, wherein the second intra-band CA based SBFD configuration subtype corresponds to an SBFD configuration that indicates a first set of subbands associated with a first component carrier and a second set of subbands associated with a second component carrier.

Aspect 14: The method of Aspect 13, wherein the first set of subbands comprises at least two subbands arranged according to a first subband configuration, and wherein the second set of subbands comprises at least two subbands arranged according to a second subband configuration.

Aspect 15: The method of Aspect 14, wherein the first subband configuration indicates a first uplink subband and a first downlink subband, and wherein the second subband configuration indicates a second uplink subband and a second downlink subband.

Aspect 16: The method of either of Aspects 14 or 15, wherein at least one of the first subband configuration or the second subband configuration indicates a first downlink subband, a second downlink subband, and an uplink subband disposed between the first downlink subband and the second downlink subband.

Aspect 17: The method of any of Aspects 14-16, wherein the first subband configuration corresponds to the second subband configuration.

Aspect 18: The method of any of Aspects 14-16, wherein the first subband configuration is different than the second subband configuration.

Aspect 19: The method of any of Aspects 10-18, wherein the third intra-band CA based SBFD configuration subtype corresponds to an SBFD configuration that indicates at least one subband associated with at least two component carriers.

Aspect 20: The method of Aspect 19, wherein the at least one subband comprises: a first downlink subband associated with a first portion of a first component carrier of the at least two component carriers, an uplink subband associated with a second portion of the first component carrier, wherein the uplink subband is further associated with a second component carrier of the at least two component carriers and a first portion of a third component carrier of the at least two component carriers, and a second downlink subband associated with a second portion of the third component carrier.

Aspect 21: The method of Aspect 20, wherein a first guard band is associated with the uplink subband and is disposed between the first component carrier and the second component carrier, and wherein a second guard band is associated with the uplink subband and is disposed between the second component carrier and the third component carrier.

Aspect 22: The method of Aspect 19, wherein the at least one subband comprises: a first downlink subband associated with a first component carrier of the at least two component carriers and a first portion of a second component carrier of the at least two component carriers, an uplink subband associated with a second portion of the second component carrier, and a second downlink subband associated with a third portion of the second component carrier, wherein the second downlink subband is further associated with a third component carrier of the at least two component carriers.

Aspect 23: The method of Aspect 22, wherein a first guard band is associated with the first downlink subband and is disposed between the first component carrier and the second component carrier, and wherein a second guard band is associated with the second downlink subband and is disposed between the second component carrier and the third component carrier.

Aspect 24: The method of any of Aspects 1-23, wherein the one or more SBFD configuration types include a supplemental uplink (SUL) based SBFD configuration type.

Aspect 25: The method of Aspect 24, wherein the SUL based SBFD configuration type corresponds to an SBFD configuration that indicates an uplink subband corresponding to an SUL configuration.

Aspect 26: A method of wireless communication performed by a network node, comprising: receiving, from a user equipment (UE), capability information indicative of a capability of the UE to support one or more subband full-duplex (SBFD) configuration types of a plurality of SBFD configuration types; and transmitting, to the UE, configuration information indicative of an SBFD configuration having an SBFD configuration type of the one or more SBFD configuration types.

Aspect 27: The method of Aspect 26, wherein the capability information is indicative of a quantity of SBFD configuration types that are supported by the UE.

Aspect 28: The method of either of Aspects 26 or 27, wherein the one or more SBFD configuration types include a resource block (RB) set based SBFD configuration type.

Aspect 29: The method of Aspect 28, wherein the RB set based SBFD configuration type corresponds to an SBFD configuration that indicates a first set of RBs associated with a downlink subband and a second set of RBs associated with an uplink subband.

Aspect 30: The method of either of Aspects 28 or 29, wherein the RB set based SBFD configuration type corresponds to an SBFD configuration that indicates a first set of RBs associated with a first downlink subband, a second set of RBs associated with a second downlink subband, and a third set of RBs associated with an uplink subband disposed between the first downlink subband and the second downlink subband.

Aspect 31: The method of any of Aspects 26-30, wherein the one or more SBFD configuration types include a bandwidth part (BWP) based SBFD configuration type.

Aspect 32: The method of Aspect 31, wherein the BWP based SBFD configuration type corresponds to an SBFD configuration that indicates a first BWP associated with a downlink subband and a second BWP associated with an uplink subband.

Aspect 33: The method of either of Aspects 31 or 32, wherein the BWP based SBFD configuration type corresponds to an SBFD configuration that indicates a first BWP associated with a first downlink subband, a second BWP associated with an uplink subband, and a third BWP associated with a second downlink subband, wherein the uplink subband is disposed between the first downlink subband and the second downlink subband.

Aspect 34: The method of any of Aspects 26-33, wherein the one or more SBFD configuration types include at least one intra-band carrier aggregation (CA) based SBFD configuration type.

Aspect 35: The method of Aspect 34, wherein the at least one intra-band CA based SBFD configuration type comprises at least one of a first intra-band CA based SBFD configuration subtype, a second intra-band CA based SBFD configuration subtype, or a third intra-band CA based SBFD configuration subtype.

Aspect 36: The method of Aspect 35, wherein the first intra-band CA based SBFD configuration subtype corresponds to an SBFD configuration that indicates a first component carrier associated with an uplink subband and a second component carrier associated with a downlink subband.

Aspect 37: The method of either of Aspects 35 or 36, wherein the first intra-band CA based SBFD configuration subtype corresponds to an SBFD configuration that indicates a first component carrier associated with a first downlink subband, a second component carrier associated with an uplink subband, and a third component carrier associated with a second downlink subband, wherein the uplink subband is disposed between the first downlink subband and the second downlink subband.

Aspect 38: The method of any of Aspects 35-37, wherein the second intra-band CA based SBFD configuration subtype corresponds to an SBFD configuration that indicates a first set of subbands associated with a first component carrier and a second set of subbands associated with a second component carrier.

Aspect 39: The method of Aspect 38, wherein the first set of subbands comprises at least two subbands arranged according to a first subband configuration, and wherein the second set of subbands comprises at least two subbands arranged according to a second subband configuration.

Aspect 40: The method of Aspect 39, wherein the first subband configuration indicates a first uplink subband and a first downlink subband, and wherein the second subband configuration indicates a second uplink subband and a second downlink subband.

Aspect 41: The method of either of Aspects 39 or 40, wherein at least one of the first subband configuration or the second subband configuration indicates a first downlink subband, a second downlink subband, and an uplink subband disposed between the first downlink subband and the second downlink subband.

Aspect 42: The method of any of Aspects 39-41, wherein the first subband configuration corresponds to the second subband configuration.

Aspect 43: The method of any of Aspects 39-41, wherein the first subband configuration is different than the second subband configuration.

Aspect 44: The method of any of Aspects 35-43, wherein the third intra-band CA based SBFD configuration subtype corresponds to an SBFD configuration that indicates at least one subband associated with at least two component carriers.

Aspect 45: The method of Aspect 44, wherein the at least one subband comprises: a first downlink subband associated with a first portion of a first component carrier of the at least two component carriers, an uplink subband associated with a second portion of the first component carrier, wherein the uplink subband is further associated with a second component carrier of the at least two component carriers and a first portion of a third component carrier of the at least two component carriers, and a second downlink subband associated with a second portion of the third component carrier.

Aspect 46: The method of Aspect 45, wherein a first guard band is associated with the uplink subband and is disposed between the first component carrier and the second component carrier, and wherein a second guard band is associated with the uplink subband and is disposed between the second component carrier and the third component carrier.

Aspect 47: The method of Aspect 44, wherein the at least one subband comprises: a first downlink subband associated with a first component carrier of the at least two component carriers and a first portion of a second component carrier of the at least two component carriers, an uplink subband associated with a second portion of the second component carrier, and a second downlink subband associated with a third portion of the second component carrier, wherein the second downlink subband is further associated with a third component carrier of the at least two component carriers.

Aspect 48: The method of Aspect 47, wherein a first guard band is associated with the first downlink subband and is disposed between the first component carrier and the second component carrier, and wherein a second guard band is associated with the second downlink subband and is disposed between the second component carrier and the third component carrier.

Aspect 49: The method of any of Aspects 26-48, wherein the one or more SBFD configuration types include a supplemental uplink (SUL) based SBFD configuration type.

Aspect 50: The method of Aspect 49, wherein the SUL based SBFD configuration type corresponds to an SBFD configuration that indicates an uplink subband corresponding to an SUL configuration.

Aspect 51: An apparatus for wireless communication at a device, comprising a processor; memory coupled with the processor; and instructions stored in the memory and executable by the processor to cause the apparatus to perform the method of one or more of Aspects 1-25.

Aspect 52: A device for wireless communication, comprising a memory and one or more processors coupled to the memory, the one or more processors configured to perform the method of one or more of Aspects 1-25.

Aspect 53: An apparatus for wireless communication, comprising at least one means for performing the method of one or more of Aspects 1-25.

Aspect 54: A non-transitory computer-readable medium storing code for wireless communication, the code comprising instructions executable by a processor to perform the method of one or more of Aspects 1-25.

Aspect 55: A non-transitory computer-readable medium storing a set of instructions for wireless communication, the set of instructions comprising one or more instructions that, when executed by one or more processors of a device, cause the device to perform the method of one or more of Aspects 1-25.

Aspect 56: An apparatus for wireless communication at a device, comprising a processor; memory coupled with the processor; and instructions stored in the memory and executable by the processor to cause the apparatus to perform the method of one or more of Aspects 26-50.

Aspect 57: A device for wireless communication, comprising a memory and one or more processors coupled to the memory, the one or more processors configured to perform the method of one or more of Aspects 26-50.

Aspect 58: An apparatus for wireless communication, comprising at least one means for performing the method of one or more of Aspects 26-50.

Aspect 59: A non-transitory computer-readable medium storing code for wireless communication, the code comprising instructions executable by a processor to perform the method of one or more of Aspects 26-50.

Aspect 60: A non-transitory computer-readable medium storing a set of instructions for wireless communication, the set of instructions comprising one or more instructions that, when executed by one or more processors of a device, cause the device to perform the method of one or more of Aspects 26-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a one or more memories; and
    one or more processors coupled to the one or more memories, the one or more memories storing instructions executable by the one or more processors to cause the UE to:
        transmit capability information indicative of a capability of the UE to support one or more subband full-duplex (SBFD) configuration types of a plurality of SBFD configuration types, wherein the one or more SBFD configuration types include a resource block (RB) set based SBFD configuration type; and
        receive configuration information indicative of an SBFD configuration having at least one SBFD configuration type of the one or more SBFD configuration types.

2. The UE of claim 1, wherein the capability information is indicative of a quantity of SBFD configuration types that are supported by the UE.

3. The UE of claim 1, wherein the RB set based SBFD configuration type corresponds to an SBFD configuration that indicates a first set of RBs associated with a downlink subband and a second set of RBs associated with an uplink subband.

4. The UE of claim 1, wherein the RB set based SBFD configuration type corresponds to an SBFD configuration that indicates a first set of RBs associated with a first downlink subband, a second set of RBs associated with a second downlink subband, and a third set of RBs associated with an uplink subband disposed between the first downlink subband and the second downlink subband.

5. The UE of claim 1, wherein the one or more SBFD configuration types include a bandwidth part (BWP) based SBFD configuration type.

6. The UE of claim 5, wherein the BWP based SBFD configuration type corresponds to an SBFD configuration that indicates a first BWP associated with a downlink subband and a second BWP associated with an uplink subband.

7. The UE of claim 5, wherein the BWP based SBFD configuration type corresponds to an SBFD configuration that indicates a first BWP associated with a first downlink subband, a second BWP associated with an uplink subband, and a third BWP associated with a second downlink subband, wherein the uplink subband is disposed between the first downlink subband and the second downlink subband.

8. The UE of claim 1, wherein the one or more SBFD configuration types include at least one intra-band carrier aggregation (CA) based SBFD configuration type.

9. The UE of claim 8, wherein the at least one intra-band CA based SBFD configuration type comprises at least one of a first intra-band CA based SBFD configuration subtype, a second intra-band CA based SBFD configuration subtype, or a third intra-band CA based SBFD configuration subtype.

10. The UE of claim 9, wherein the first intra-band CA based SBFD configuration subtype corresponds to an SBFD configuration that indicates a first component carrier associated with an uplink subband and a second component carrier associated with a downlink subband.

11. The UE of claim 9, wherein the first intra-band CA based SBFD configuration subtype corresponds to an SBFD configuration that indicates a first component carrier associated with a first downlink subband, a second component carrier associated with an uplink subband, and a third component carrier associated with a second downlink subband, wherein the uplink subband is disposed between the first downlink subband and the second downlink subband.

12. The UE of claim 9, wherein the second intra-band CA based SBFD configuration subtype corresponds to an SBFD configuration that indicates a first set of subbands associated with a first component carrier and a second set of subbands associated with a second component carrier.

13. The UE of claim 12, wherein the first set of subbands comprises at least two subbands arranged according to a first subband configuration, and wherein the second set of subbands comprises at least two subbands arranged according to a second subband configuration.

14. The UE of claim 13, wherein the first subband configuration indicates a first uplink subband and a first downlink subband, and wherein the second subband configuration indicates a second uplink subband and a second downlink subband.

15. The UE of claim 13, wherein at least one of the first subband configuration or the second subband configuration indicates a first downlink subband, a second downlink subband, and an uplink subband disposed between the first downlink subband and the second downlink subband.

16. The UE of claim 13, wherein the first subband configuration corresponds to the second subband configuration.

17. The UE of claim 13, wherein the first subband configuration is different than the second subband configuration.

18. The UE of claim 9, wherein the third intra-band CA based SBFD configuration subtype corresponds to an SBFD configuration that indicates at least one subband associated with at least two component carriers.

19. The UE of claim 18, wherein the at least one subband comprises:
  a first downlink subband associated with a first portion of a first component carrier of the at least two component carriers,
  an uplink subband associated with a second portion of the first component carrier, wherein the uplink subband is further associated with a second component carrier of the at least two component carriers and a first portion of a third component carrier of the at least two component carriers, and
  a second downlink subband associated with a second portion of the third component carrier.

20. The UE of claim 19, wherein a first guard band is associated with the uplink subband and is disposed between the first component carrier and the second component carrier, and wherein a second guard band is associated with the uplink subband and is disposed between the second component carrier and the third component carrier.

21. The UE of claim 18, wherein the at least one subband comprises:
  a first downlink subband associated with a first component carrier of the at least two component carriers and a first portion of a second component carrier of the at least two component carriers,
  an uplink subband associated with a second portion of the second component carrier, and
  a second downlink subband associated with a third portion of the second component carrier, wherein the second downlink subband is further associated with a third component carrier of the at least two component carriers.

22. The UE of claim 21, wherein a first guard band is associated with the first downlink subband and is disposed between the first component carrier and the second component carrier, and wherein a second guard band is associated with the second downlink subband and is disposed between the second component carrier and the third component carrier.

23. The UE of claim 22, wherein the one or more SBFD configuration types include a supplemental uplink (SUL) based SBFD configuration type, wherein the SUL based SBFD configuration type corresponds to an SBFD configuration that indicates an uplink subband corresponding to an SUL configuration.

24. A network node for wireless communication, comprising:
  a one or more memories; and
  one or more processors coupled to the one or more memories, the one or more memories storing instructions executable by the one or more processors to cause the network node to:
    receive, from a user equipment (UE), capability information indicative of a capability of the UE to support one or more subband full-duplex (SBFD) configuration types of a plurality of SBFD configuration types, wherein the one or more SBFD configuration types include a resource block (RB) set based SBFD configuration type; and transmit, to the UE, configuration information indicative of an SBFD configuration having an SBFD configuration type of the one or more SBFD configuration types.

25. The network node of claim 24, wherein the one or more SBFD configuration types include at least one of a bandwidth part (BWP) based SBFD configuration type, an intra-band carrier aggregation (CA) based SBFD configuration type, or a supplemental uplink (SUL) based SBFD configuration type.

26. A method of wireless communication performed by a user equipment (UE), comprising:

transmitting capability information indicative of a capability of the UE to support one or more subband full-duplex (SBFD) configuration types of a plurality of SBFD configuration types, wherein the one or more SBFD configuration types include a resource block (RB) set based SBFD configuration type; and receiving configuration information indicative of an SBFD configuration having at least one SBFD configuration type of the one or more SBFD configuration types.

27. The method of claim 26, wherein the one or more SBFD configuration types include at least one of a bandwidth part (BWP) based SBFD configuration type, an intra-band carrier aggregation (CA) based SBFD configuration type, or a supplemental uplink (SUL) based SBFD configuration type.

28. The method of claim 26, wherein the RB set based SBFD configuration type corresponds to an SBFD configuration that indicates a first set of RBs associated with a downlink subband and a second set of RBs associated with an uplink subband.

29. A method of wireless communication performed by a network node, comprising:

receiving, from a user equipment (UE), capability information indicative of a capability of the UE to support one or more subband full-duplex (SBFD) configuration types of a plurality of SBFD configuration types, wherein the one or more SBFD configuration types include a resource block (RB) set based SBFD configuration type; and transmitting, to the UE, configuration information indicative of an SBFD configuration having an SBFD configuration type of the one or more SBFD configuration types.

30. The method of claim 29, wherein the one or more SBFD configuration types include at least one of a bandwidth part (BWP) based SBFD configuration type, an intra-band carrier aggregation (CA) based SBFD configuration type, or a supplemental uplink (SUL) based SBFD configuration type.

* * * * *